Patented Oct. 11, 1927.

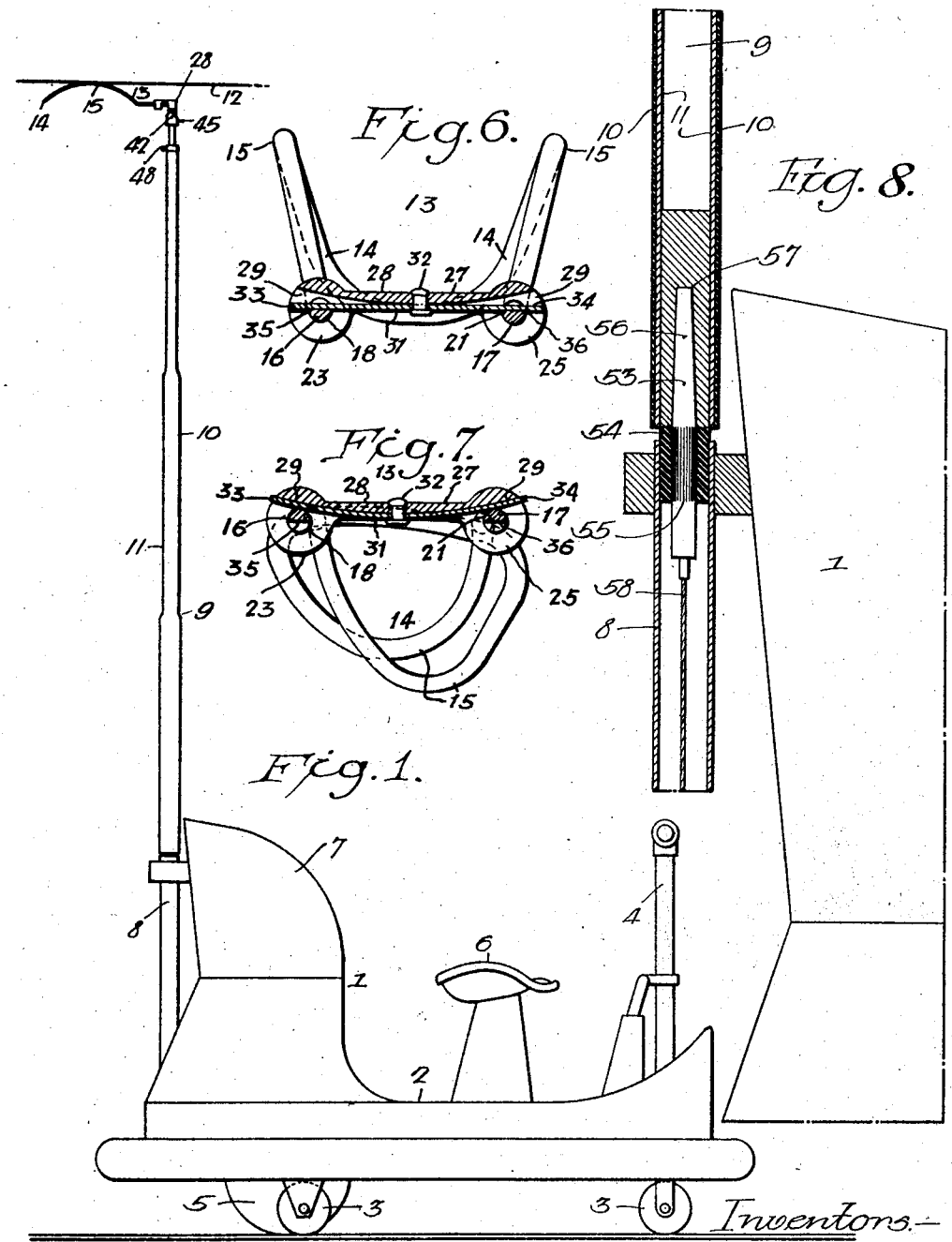

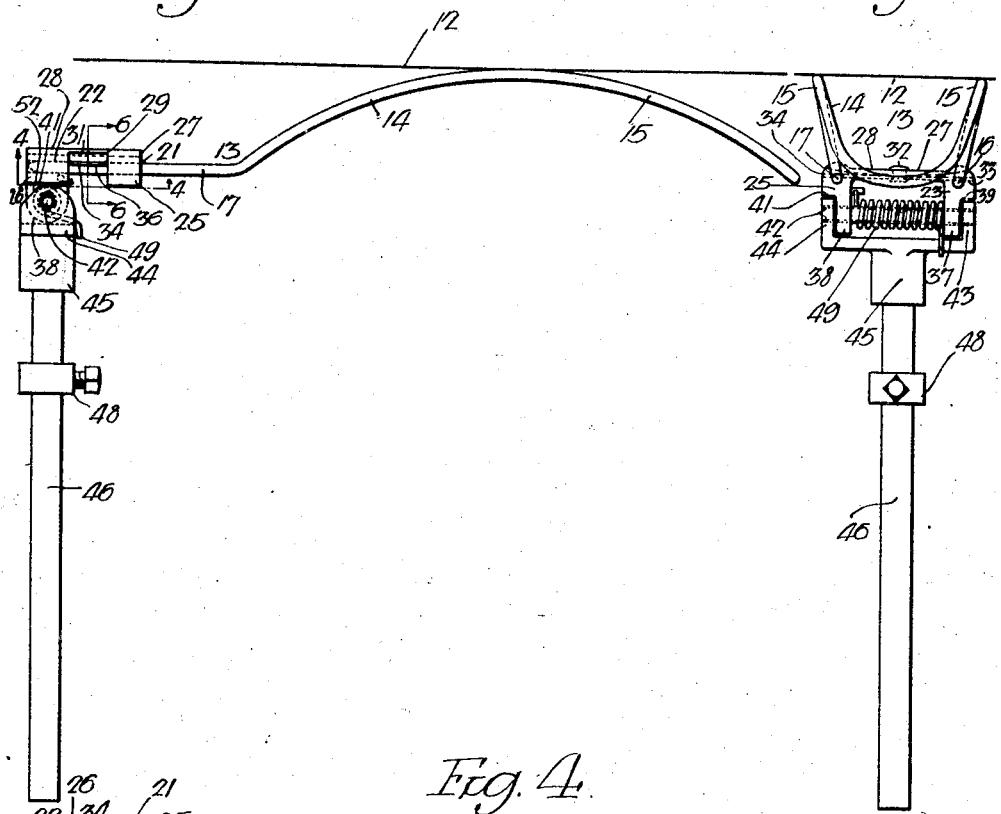

1,645,437

UNITED STATES PATENT OFFICE.

JOSEPH LUSSE AND ROBERT LUSSE, OF PHILADELPHIA, PENNSYLVANIA, ASSIGNORS TO LUSSE BROTHERS, A PARTNERSHIP CONSISTING OF JOSEPH LUSSE AND ROBERT LUSSE, BOTH OF PHILADELPHIA, PENNSYLVANIA.

CURRENT COLLECTOR.

Application filed May 13, 1924. Serial No. 712,995.

Our invention relates to current collectors, having particular relation to such collectors as are applicable to electrical amusement apparatus.

One object of our invention is to provide a current collector, the contact element of which may be quickly and efficiently replaced with a minimum expenditure of time and of money.

Another object of our invention is to provide a current collector which embodies a replaceable contact element together with means for releasably locking the contact element in position.

A further object of our invention is to provide a current collector, wherein the contact element is adapted to engage a charged ceiling with a substantially uniform force, regardless of slight irregularities in the height of the ceiling.

A still further object of our invention is to provide a detachable trolley pole for an electrically operated amusement car, whereby the handling of the car may be facilitated during periods of repair.

Other objects and applications of our invention, as well as details of construction and operation, whereby the same may be practiced, will appear more fully hereinafter when taken in connection with the accompanying drawings, wherein, Fig. 1 is a side elevational view of our invention, illustrating the application thereof to an amusement car;

Figs. 2 and 3 are side elevational and end views, respectively, of the current collector of Fig. 1;

Fig. 4 is a horizontal sectional view taken on the line 4—4 of Fig. 2, illustrating the normal locked position of the contact element;

Fig. 5 is a view similar to Fig. 4 but showing the contact element in the unlocked position;

Fig. 6 is a transverse sectional view taken on the line 6—6 of Fig. 2, showing the current collector parts in the locked position of Fig. 4;

Fig. 7 is a view similar to Fig. 6 but illustrating the position of the parts in the unlocked position of Fig. 5;

Fig. 8 is a detail view, partially in vertical section, of the rear end of the electric car of Fig. 1.

In order to facilitate the description of our invention, we have shown it applied to an amusement car 1 of the general type disclosed in our co-pending application Ser. No. 592,075, filed Oct. 3, 1922, though of course, our invention is not to be specifically limited to such showing. The electric car 1, of which Fig. 1 is a side elevational view, comprises a flat platform 2 which is supported on casters 3, one of which serves as a steering wheel, being controlled by a steering post 4. A driving wheel 5 is carried by the platform 2 and it is adapted to be controlled by the operation of the steering post 4. The platform 2 may be provided with a front seat 6 and a rear seat 7, the latter having a support for a base section 8 (Fig. 8) of an overhead trolley pole 9, a detachable portion 11 of which extends vertically upwardly above the body of the car 1 into proximity with a metallic ceiling 12 with which it makes contact by means of a current collector 13.

Heretofore, considerable annoyance has been experienced due to the expense and inconvenience of replacing the current collector as well as the poor operating characteristics thereof. These undesirable results are overcome in our invention by the provision of a current collector 13, of which Figs. 2 to 7, inclusive, are detail views. As therein illustrated, the current collector 13 comprises a contact element 14 which may take the form of a wire loop of U-shape having a curved or bowed portion 15 and substantially straight end portions 16 and 17. The end portions 16 and 17 may be removably positioned in pairs of aligned perforations 18—19 and 21—22 formed in corresponding pairs of lugs 23—24 and 25—26, respectively, the latter depending from a main body portion 27 of a supporting block 28.

In order to lock the contact end portions 16 and 17 in position, yet permit of their ready removal when it is necessary to replace a worn contact element 14 with a new one, we provide a transversely extending slot 29 on the underside of the main body portion 27 intermediate the pairs of depending lugs 23—25 and 24—26, positioning therein a spring strip 31 or other resilient element. Lateral movement of the spring strip 31 in the recess 29 may be avoided by riveting the center portion thereof to the body portion 27, as at 32, thereby forming oppositely extending arms 33 and 34. The arms 33 and 34 may normally engage recesses 35 and 36, respectively, which are formed in the upper side of the contact end portions positioned between the pairs of depending lugs 23—25 and 24—26. This position of the parts, which is illustrated in detail in Figs. 4 and 6, may be called the normal locked position of the contact element 14, since the latter cannot be withdrawn from the several perforations of the supporting block 28.

According to our invention, however, the contact element 14 may be readily released from the locked position shown in Figs. 4 and 6 by twisting the curved portions 15 of the contact element 14 about the longitudinal axis thereof. As may readily be seen, such twisting causes a turning movement of the contact end portions 16 and 17 from the positions shown in Figs. 4 and 6, where the spring arms 33 and 34 respectively engage the recesses 35 and 36 to the positions shown in Figs. 5 and 7 where the curved part of the end portions 16 and 17 is engaged. Since the application of force to the contact element 14 now results in the removal of the latter from the supporting block 28, this position may be called the unlocked or released position of the contact element 14. In order to permit of the flexing of the arms 33 and 34 from the position shown in Fig. 6 to that shown in Fig. 7, as the curved portion 15 of the contact element 14 is twisted, the base of the laterally extending recess 29 is curved as shown in the figures just mentioned.

The rear lugs 24 and 26 of the supporting block 28 are provided with depending portions 37 and 38 forming shoulders 39 and 41, for reasons as will appear more fully hereinafter. The depending portions 37 and 38 are perforated to receive a pivot pin 42, the opposite ends of which are supported by upwardly extending lugs 43 and 44 formed on a bracket member 45. The bracket member 45 may be mounted on an upper end of a rod 46 which is adapted to engage slidably an upper end of the detachable pole section 11. An adjustable collar 48, which is mounted on the rod 46, provides for variations in the desired maximum height of the trolley pole 9.

The curved portion 15 of the contact element 14 may be held in resilient engagement with the ceiling 12 by means of a spring 49 which encircles the pivot rod 42, the opposite ends of the spring 49 being secured to the supporting block 28 and the bracket member 45, respectively. In order to limit the vertical movement of the contact element 14 under the action of the spring 49 when the contact element 14 is out from under the ceiling 12, the bracket lugs 43 and 44 (Figs. 2 and 3) are positioned directly beneath the shoulders 39 and 41, respectively, so that the latter engages flat portions 52, which are formed on the bracket lugs 43 and 44, in the upper limiting position only.

Our invention further contemplates a detachable trolley pole involving the use of the upper pole section 11 and the base portion 9. As shown in Fig. 8, the upper end of the base section 8 is provided with a swivel pin 53 which is mounted in a fibre ferrule 54 rigidly secured in the open end of the section 8. Movement of the swivel pin 53 and ferrule 54 may be avoided by providing the former with a series of grooves 55. The swivel pin 53 has a tapered portion 56 which engages a tapered boring 57 formed in the lower end of the upper trolley section 11. The fibre ferrule 54 extends above the upper edge of the base section 8 an amount sufficient to provide an insulated support for the upper pole section 11.

As may be readily seen, currents may be supplied to the driving motor (not shown) of the amusement car 1 from the metallic ceiling 12 through the hinged contact element 14, the upper detachable trolley pole section 11, the swivel pin 53 and an electrical conductor 58 which extends from the latter to the electrical driving motor, the operation of which is controlled by the steering element 4, as set forth in my co-pending application above noted. Undesirable contact with the charged detachable trolley pole section 11 may be avoided by providing the same with an insulating covering 10 in the usual manner.

While we have shown and described only one form of embodiment of our invention, for the purpose of illustrating the underlying principles of construction and operation thereof, it is apparent that various changes and modifications may be made therein without departing from the spirit of our invention. We desire, therefore, that only such limitations shall be imposed thereon, as are indicated in the appended claims or as are demanded by the prior art.

We claim:

1. A collector comprising a flexible contact element of U-shape, one portion being provided with locking shoulders, another portion being bowed and twistable about the longitudinal axis thereof.

2. A collector comprising a U-shaped contact element, and a member providing a releasable locking support for the ends thereof, said contact element being released upon the twisting thereof.

3. A current collector comprising a conducting element, a longitudinally extending portion of which is of bowed loop form, and a member, another portion being so associated with said member as to be normally locked thereby but releasable by the twisting of said longitudinal portion.

4. A collector comprising a contact element and a supporting member therefor, said contact element being normally locked but releasable by twisting from the normal position.

5. In a collector, the combination with a flexible contact element having an end portion provided with a locking shoulder, of a supporting element having a flexible shoulder for said contact element, said shoulders being normally interlocked but detachable when said flexible contact element is twisted.

6. In combination, a trolley pole, a supporting element hinged thereto and a contact element having one end free and the other end so carried by said supporting element as to be normally locked in position but releasable by twisting.

7. A collector comprising a flexible contact element, a supporting block therefor and means normally operable to lock said contact, said means being rendered ineffective when said contact element is twisted.

8. A collector comprising a contact element having an end portion provided with a shoulder, a supporting block, and a flexible locking element normally co-operating with said shoulder to lock said contact element in position, said locking element being movable out of engagement with said shoulder onto another portion of said end portion upon the twisting of said contact element.

9. In combination, a looped contact element, a block adapted to support removably the ends of said element, and a resilient locking element, said contact element being provided with locking shoulders positioned to be engaged normally by said resilient element, said locking engagement being released upon a deflection of said contact element.

10. In combination, a contact element, a supporting block apertured to receive the same, and a spring element carried by said block, said contact element having a recessed portion adapted to receive said spring element, whereby said contact element may be releasably locked in position.

11. In combination, a contact element, a supporting block apertured to receive the end portions thereof, said end portions being provided with recesses, and a resilient element so carried by said supporting block as to engage normally said recesses, said engagement being released upon a twisting movement of said contact element.

12. In combination, a contact element, a block apertured to receive the end portions of the same, and a spring element secured to said block and provided with oppositely extending arms, said contact end portions having recesses adapted to receive, respectively, said arms, whereby said contact element may be normally locked in position, but permitting the release of the same upon a deflection from the normal position.

13. In combination, a wire element, a block apertured to receive the ends thereof, said block being provided with a recess, and a resilient element positioned in said recess, the portions of said wire ends immediately adjacent to said recess being provided with slots adapted to receive said resilient element, whereby said wire element may be normally locked in position, but releasable upon a deflection sufficient to cause said resilient element to be moved out of engagement with said slots.

14. In combination, a trolley pole, a supporting block pivotally mounted thereon, resilient means operable to cause said block to move laterally of the axis of said pole, a contact element, said block being formed to support removably one end of said contact element, and resilient locking means for said contact element, whereby the latter may be releasably locked by adjustment.

15. Apparatus comprising a contact element, a supporting block therefor, and a spring element carried by said block, said contact element having a recessed portion adapted to receive said spring element whereby said contact element may be releasably locked in position.

16. An electrical collector comprising a contact element, a clasp providing a detachable mounting therefor, a vertically adjustable support for pivotally mounting said clasp, and resilient means tending to cause a movement of said contact element relative to said vertically adjustable support.

17. A current collector comprising a conducting element, a clasp for detachably locking the same in position, said clasp being provided with depending lugs and adjacent shoulder portions, a base member having upwardly extending lugs carrying a pivot pin, the latter having an operative connection with said depending lugs, and resilient means tending to move said clamp relative to said base member, said base member lugs being disposed adjacent to said shoulders and so formed as to constitute abutments for said shoulder portions, whereby the extent of movement of said clasp may be determined.

18. In combination, a detachable trolley pole, a block hinged thereto, a wire contact element, said block being apertured to receive the end portions of said contact element, and a spring element carried by said block transversely of said end portions, said end portions having slots for the reception of said spring element, permitting said contact element to be normally locked, but released upon a deflection thereof.

19. A contact element having end portions, a block adapted to receive the end portions of said contact element, a spring element secured to said block so as to form arms, said end portions having shoulders in cooperative relation to said arms whereby said contact element may be releasably locked.

20. Apparatus comprising a contact element, a block adapted to support the ends of said contact element, said block being provided with a concave surface extending transversely of said end portions, a spring element supported on said surface with the ends thereof respectively in proximity to said end portions, the latter being adapted to interlock releasably with said spring element.

JOSEPH LUSSE.
ROBERT LUSSE.